(No Model.)
R. BRATKA.
WINDMILL.
No. 580,761. Patented Apr. 13, 1897.
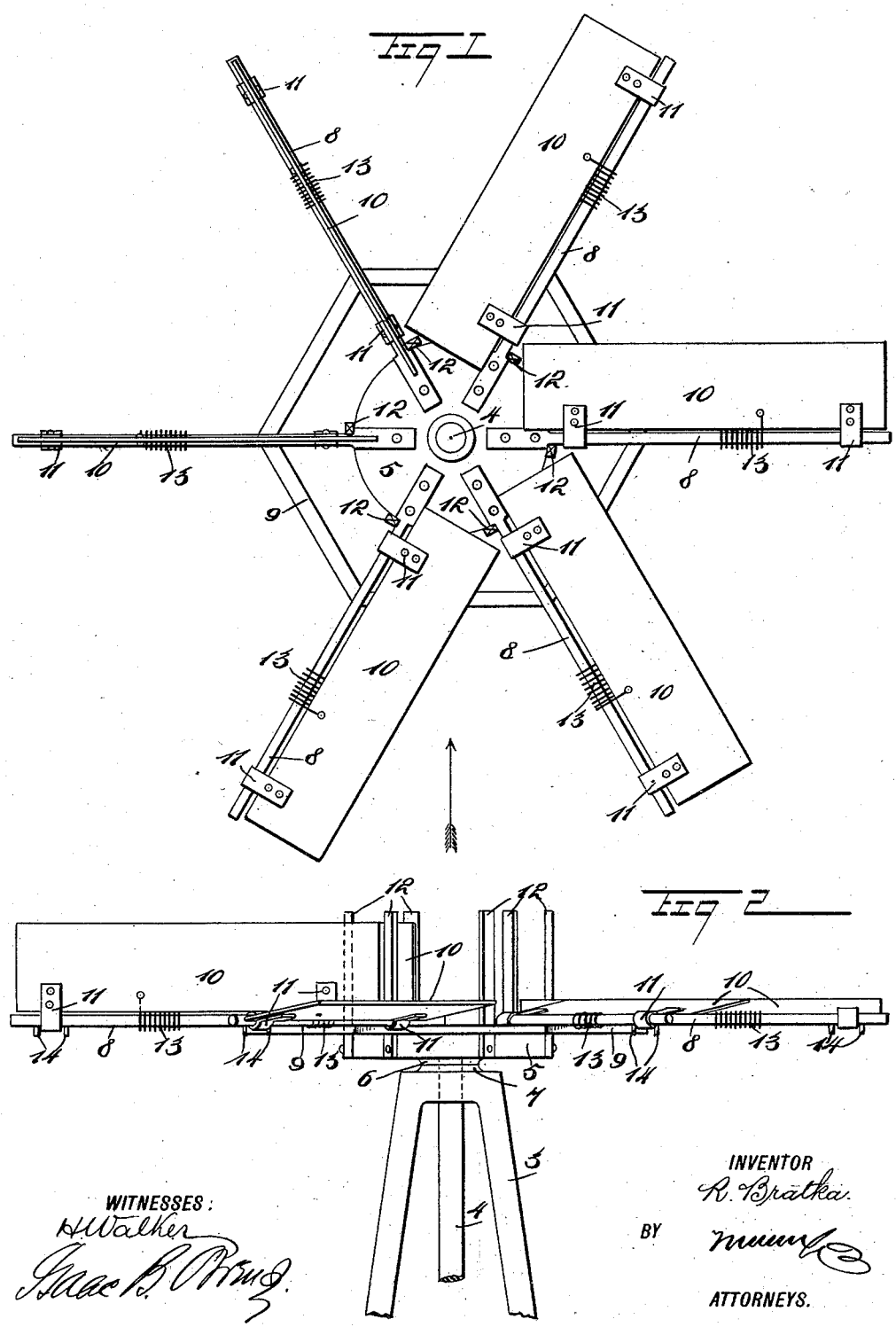
WITNESSES:
INVENTOR
R. Bratka.
BY
ATTORNEYS.

UNITED STATES PATENT OFFICE.

RUDOLPH BRATKA, OF MINNESOTA LAKE, MINNESOTA.

WINDMILL.

SPECIFICATION forming part of Letters Patent No. 580,761, dated April 13, 1897.

Application filed February 20, 1897. Serial No. 624,304. (No model.)

*To all whom it may concern:*

Be it known that I, RUDOLPH BRATKA, of Minnesota Lake, in the county of Faribault and State of Minnesota, have invented a new and Improved Windmill, of which the following is a full, clear, and exact description.

This invention relates to a windmill of that class in which the wheels are mounted on vertical axes and turn in a horizontal plane.

The invention is also related to the class in which these horizontal wheels have blades pivoted on arms radiating from the axes, the blades swinging from a horizontal to a vertical position as the wheel turns.

The invention will be fully described hereinafter and defined in the claims.

Reference is to be had to the accompanying drawings, forming a part of this specification, in which similar characters of reference indicate corresponding parts in both the figures.

Figure 1 is a plan view of the invention, and Fig. 2 is a side elevation.

The tower 3 of the windmill carries the vertical shaft 4, forming the axis of the windmill, and having the hub-disk 5 fixed thereto. The hub-disk has a boss 6 at its under side, the boss bearing on a boss 7, carried by the tower 3. Fixed to the upper side of the disk 5 are a series of radial arms or spokes 8. These arms or spokes project outwardly beyond the periphery of the disk 5 and are connected to a hexagonal brace-rim 9, running around the disk and separated therefrom, as shown in Fig. 1.

Each arm 8 is provided with a blade 10. Each blade 10 has two straps 11, which embrace the respective arms 8 and serve to mount the blades to rock on the arms. When the blades are in a horizontal position, their inner ends rest on the disk 5, and when the blades are in a vertical position they respectively bear against standards 12, fixed to the periphery of the disk 5. Each blade 10 is actuated by a spring 13, which springs are respectively carried by the arms 8 and serve to raise the blades. The outer portion of each arm 8 is provided with two pins 14, the pairs of pins respectively having their members arranged to embrace the outer strap 11 on each blade 10, so as to prevent the blades 10 from sliding on the arms 8, but permit them to swing within the quadrant lying between the respective standards 12 and the disk 5. A wind-wheel of this construction turns freely by the operation of the wind blowing thereon. As the spokes or arms 8 move toward or into the wind the force of their respective springs 13 is overcome and the blades thrown horizontally. When the arms pass the line in which the wind is blowing, the pressure of the wind, being relieved from the front of the blades, permits the springs to raise their respective blades to a vertical position and allows the wind to act on the blades to turn the wheel.

Having thus described my invention, I claim as new and desire to secure by Letters Patent—

1. The combination of a mounted shaft, a disk fixed thereto, spokes or arms carried by and radiating from the disk, a brace-rim connected to the spokes or arms and running around the disk, a blade mounted to swing on each spoke or arm, a spring pressing each blade to an operative position, and a standard for each blade, the standards being carried by the periphery of the disk and serving to hold the blades in vertical position, substantially as described.

2. The combination with a tower, of a shaft mounted to turn therein, a disk fixed to the shaft, a series of spokes radiating from the disk, a blade mounted to swing on each spoke, a spring pressing each blade to a vertical position, a standard for holding each blade vertical, the standards being carried by the disk, and a brace-rim fixed to the spokes or arms and embracing the disk, substantially as described.

3. A windmill having a mounted disk, a spoke or arm radiating therefrom, a blade mounted to rock on the spoke or arm, a spring pressing the blade to a vertical position, the blade resting on the disk when the blade is disposed horizontally, and a standard carried by the disk and serving to maintain the blade in a vertical position, substantially as described.

4. The combination of a revolubly-mounted disk, a plurality of spokes or arms carried thereby, a blade mounted to swing on each spoke or arm, the blades resting on the disk when the blades are horizontal, and a standard for holding each blade in a vertical position, the standards being carried by the disk, substantially as described.

RUDOLPH BRATKA.

Witnesses:
JOSEPH DRIML,
VACLAV A. BĚLE.